United States Patent
Zhang et al.

(10) Patent No.: US 8,654,816 B2
(45) Date of Patent: Feb. 18, 2014

(54) METHODS AND DEVICES FOR DETERMINING A TRANSMISSION RANK

(75) Inventors: Haochuan Zhang, Beijing (CN); Yang Hu, Beijing (CN); Shaohua Li, Beijing (CN); Xinghua Song, Beijing (CN); Jianfeng Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 109 days.

(21) Appl. No.: 13/375,927

(22) PCT Filed: Oct. 18, 2011

(86) PCT No.: PCT/SE2011/051245
§ 371 (c)(1),
(2), (4) Date: Dec. 2, 2011

(87) PCT Pub. No.: WO2013/058685
PCT Pub. Date: Apr. 25, 2013

(65) Prior Publication Data
US 2013/0094543 A1    Apr. 18, 2013

(51) Int. Cl.
*H04B 1/00*     (2006.01)
(52) U.S. Cl.
USPC ........... 375/141; 375/220; 375/267; 375/299; 455/13.4; 455/522; 370/252; 370/278; 370/318
(58) Field of Classification Search
USPC ......... 375/141, 146, 147, 220, 260, 267, 299, 375/340; 455/13.4, 522, 67.11, 101, 226.1, 455/226.2, 226.4; 370/203, 252, 278, 282, 370/318, 437, 464, 465
See application file for complete search history.

(56) References Cited

U.S. PATENT DOCUMENTS

| | | | |
|---|---|---|---|
| 2008/0303699 A1* | 12/2008 | Zhang et al. | 341/67 |
| 2011/0096815 A1* | 4/2011 | Shin et al. | 375/219 |
| 2011/0261894 A1* | 10/2011 | Yu et al. | 375/267 |
| 2013/0028343 A1* | 1/2013 | Jongren | 375/267 |
| 2013/0114425 A1* | 5/2013 | Sayana et al. | 370/252 |

OTHER PUBLICATIONS

Ericsson, et al., "Considerations on Real-Life DL MIMO Aspects," 3GPP Draft; R1-111330_Real_Life_Issues, 3rd Generation Partnership Project (3GPP), Mobile Competence Centre; May 3, 2011.
Huawei, et al., "Analysis of Closed-Loop Downlink MIMO Rank Adaptation with Received Power Imbalance," 3GPP Draft; R1-112046, 3rd Generation Partnership Project (3GPP), Mobile Competence Centre, Aug. 19, 2011.
International Search Report issued in Application No. PCT/SE2011/051245 dated Sep. 25, 2012.

* cited by examiner

*Primary Examiner* — Dac Ha
(74) *Attorney, Agent, or Firm* — Nixon & Vanderhye, P.C.

(57) ABSTRACT

The invention relates to a method 20 in a base station 2 for determining a transmission rank. The base station 2 controls two or more transmit antenna ports 3a, 3b for supporting a multi-antenna transmission mode and for transmission of data on a channel for communication with a user equipment 4. The method 20 comprises receiving 21 a rank indicator from a user equipment 4, the rank indicator indicating the number of spatial multiplexing layers recommended by the user equipment 4, and determining 22 the transmission rank based on a channel imbalance factor CIF, wherein the channel imbalance factor CIF quantifies a difference in receive power of the two or more transmit antenna ports 3a, 3b. The invention also relates to a base station, methods in user equipment, user equipment, computer programs, and computer program products.

25 Claims, 4 Drawing Sheets

METHODS AND DEVICES FOR DETERMINING A TRANSMISSION RANK

This application is the U.S. national phase of International Application No. PCT/SE2011/051245 filed 18 Oct. 2011, the entire contents of each of which is hereby incorporated by reference.

TECHNICAL FIELD

The technology disclosed herein relates generally to the field of wireless communication systems, and in particular to rank adaptation in such wireless communication systems.

BACKGROUND

Multiple-input multiple-output (MIMO), referring to multiple antennas at transmitter and receiver sides, is an advanced antenna technology widely applied in wireless communication systems, for example in Universal Mobile Telecommunication Service (UMTS), Worldwide Interoperability for Microwave Access (WiMAX) and Long Term Evolution (LTE).

In LTE, there are two main kinds of transmission schemes in downlink (DL) MIMO: open-loop schemes, e.g. transmit diversity (T×D) and cyclic delay diversity (CDD), and closed-loop schemes, e.g. codebook based precoding and non-codebook based precoding. Reference signals for downlink antenna ports are MIMO enablers, providing channel-dependent measurements, such as rank indicator (RI), precoding matrix index (PMI) and channel quality indicator (CQI), which are then reported by the user equipment in order to assist downlink transmission.

The antenna ports referred to above do not necessarily correspond to specific physical antennas. At least for the downlink, an antenna port can be seen as corresponding to the transmission of a certain reference signal. Any subsequent data transmission from the antenna port can then rely on that certain reference signal for channel estimation for coherent demodulation. Thus, if the same reference signal is transmitted from multiple physical antennas, these physical antennas correspond to a single antenna port. Similarly, if two different reference signals are transmitted from the same set of physical antennas, this corresponds to two separate antenna ports. Stated differently, each antenna port has a unique reference signal associated with it.

Among various practical antenna configurations, geographically-separated antenna ports have been identified as high-priority work item by 3GPP. Geographically-separated antenna ports, such as macro-node with low-power remote radio heads (RRHs) and indoor interleaved antennas ports, are deployed in a way so that the whole set of the antenna ports are not located at a single geographical site, but rather divided into several parts and located at different geographical sites. FIG. 1 illustrates an indoor deployment of interleaved antenna ports, where two antenna ports are distributed at different geographical sites in an interleaved manner.

In the scenario of FIG. 1, every other antenna thus transmits on antenna port 0 (Cell specific reference signal (CRS) port 0) and the other antenna transmits on antenna port 1 (CRS port 1). Advantages of such an interleaved deployment include a reduction in the need of cabling (primarily when upgrading existing passive based distributed antenna systems to support MIMO), as well as a reduction in the number of antennas, compared to deploying two co-located antenna ports per site.

However, measurement results from real networks revealed that spatial multiplexing does not work as expected in the interleaved antenna port deployment. In the contribution R1-111330, "Considerations on Real-Life DL MIMO Aspects", Ericsson, ST-Ericsson, presented at 3GPP TSG-RAN WG1, Barcelona, Spain, May 9-May 13, 2011, it was shown that close to a site, the two antenna ports undergo a very large difference in receive power, on the order of 35 dB, creating a highly imbalanced, i.e. rank-deficient, MIMO channel.

The measurement results showed an unexpected bad performance. FIGS. 2A and 2B illustrate the received signal strength (Reference Signal Received Power, RSRP) and throughput, respectively, when the user equipment moved from one site to another (e.g. from point A to point B of FIG. 1). FIG. 2A illustrates the RSRP measured at the user equipment, where the peaks correspond to the user equipment being close to one site. FIG. 2B illustrates the throughput of the user equipment. Surprisingly, very low throughput, close to zero, is observed at positions corresponding to RSRP peaks.

The measurement results described above indicate that user equipment is not always able to cope with antenna ports having an imbalance in terms of received power.

SUMMARY

An object of the present invention is to solve or at least mitigate the above mentioned problem.

The object is according to a first aspect achieved by a method in a base station for determining a transmission rank. The base station controls two or more transmit antenna ports for supporting a multi-antenna transmission mode and for transmission of data on a channel for communication with a user equipment. The method comprises: receiving a rank indicator from a user equipment, the rank indicator indicating the number of spatial multiplexing layers recommended by the user equipment, and determining the transmission rank based on a channel imbalance factor, wherein the channel imbalance factor quantifies a difference in receive power of the two or more transmit antenna ports.

The method improves the likelihood that the base station, e.g. an eNode B, will instantaneously select an appropriate transmission rank. With the knowledge of channel imbalance at the base station, the base station can override the user equipment's incorrect ranking report, e.g. override the user equipment's rank-2 report to rank-1 transmission, without waiting for a long time to obtain statistical information. The method is applicable to any rank-deficient channels, e.g. MIMO channels with strong spatial correlation. Further, the method is applicable in different systems, e.g. frequency division duplexing systems and time division duplexing systems.

In an embodiment, the determining of the transmission rank based on a channel imbalance factor CIF is performed for a received rank indicator larger than 1.

In an embodiment, the determining of the transmission rank based on a channel imbalance factor CIF is performed for a received rank indicator equal to 2.

In an embodiment, the determining of the transmission rank based on a channel imbalance factor CIF comprises comparing the channel imbalance factor CIF with a threshold value $\Gamma_{th}$, and determining the transmission rank to be equal to the received rank indicator if the channel imbalance factor CIF is equal to or smaller than the threshold value $\Gamma_{th}$ and determining the transmission rank to be equal to one if the channel imbalance factor CIF is larger than the threshold value $\Gamma_{th}$.

In a variation of the above embodiment, the threshold value $\Gamma_{th}$ is set based on a probability that the transmission rank would give high data throughput.

In a variation of the above embodiment, the probability is determined by simulation in a communication system comprising the base station.

In an embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column represents the channel between the i-th transmit antenna at the user equipment and all the receive antennas at the base station, $N_t$ is the number of transmit antennas of the user equipment and $N_r$ is the number of receive antennas of the base station and the channel imbalance factor CIF is determined by:

$$CIF = 10 \lg \frac{\max_i \|h_i\|}{\min_i \|h_i\|},$$

where $h_i$ is the i-th column of the uplink channel matrix H, and $\|h\|$ is the Frobenius norm of a vector h.

In another embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column represents the channel between the i-th transmit antenna at the user equipment and all the receive antennas at the base station, $N_t$ is the number of transmit antennas of the user equipment and $N_r$ is the number of receive antennas of the base station, and the channel imbalance factor (CIF) is determined by:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, and $H^H$ is the Hermitian transposition of H.

In still another embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column represents the channel between the i-th transmit antenna at the user equipment and all the receive antennas at the base station, $N_t$ is the number of transmit antennas of the user equipment and $N_r$ is the number of receive antennas of the base station and the channel imbalance factor (CIF) is determined by:

$$CIF = \frac{\lambda_{max}(H^H H)}{\lambda_{min}(H^H H)},$$

where $\lambda_{min}$ ($H^H H$) denotes the maximum eigenvalue of the matrix $H^H H$, and $\lambda_{min}$ ($H^H H$) denotes the minimum eigenvalue of the matrix $H^H H$.

In an embodiment the method comprises, performing channel measurements for determining the uplink channel matrix H prior to the determining of transmission rank.

In an embodiment, the method comprises utilizing the determined transmission rank in communication with the user equipment.

In a second aspect, a base station for determining a transmission rank is provided. The base station comprises a processor for controlling two or more transmit antenna ports for supporting a multi-antenna transmission mode and for transmission of data on a channel for communication with a user equipment. The base station comprises: a receiver configured to receive a rank indicator from a user equipment, the rank indicator indicating the number of spatial multiplexing layers recommended by the user equipment, and a processor configured to determine the transmission rank based on a channel imbalance factor CIF, wherein the channel imbalance factor CIF quantifies a difference in receive power of the two or more transmit antenna ports.

In a third aspect, a computer program for a base station for determining a transmission rank is provided. The base station is controlling two or more transmit antenna ports for supporting a multi-antenna transmission mode and for transmission of data on a channel for communication with a user equipment. The computer program comprises computer program code, which, when run on the base station, causes the base station to perform the steps of: receiving a rank indicator from a user equipment, the rank indicator indicating the number of spatial multiplexing layers supported by the user equipment, and determining the transmission rank based on a channel imbalance factor, wherein the channel imbalance factor quantifies a difference in receive power of the two or more transmit antenna ports.

In a fourth aspect, a computer program product is provided comprising a computer program as above, and a computer readable means on which the computer program is stored.

In a fifth aspect, a method in a user equipment for determining a rank indicator is provided. The user equipment comprises two or more receive antennas for supporting a multi-antenna reception mode and for receiving data on a channel used in communication with a base station. The method comprises: performing channel measurements for determining a downlink channel matrix; and determining the rank indicator based on a channel imbalance factor, wherein the channel imbalance factor quantifies a difference in receive power of the two or more receive antennas.

The method improves the likelihood that the user equipment will report a suitable rank indicator. With the knowledge of a channel imbalance channel at the user equipment, the user equipment can correct its behaviour in rank calculation and e.g. report rank 1 instead of rank 2 to match such a channel.

In an embodiment, the method comprises selecting a rank indicator based on the determined downlink channel matrix, wherein the rank indicator indicates a number of spatial multiplexing layers of recommended by the user equipment.

In an embodiment, the determining of the rank indicator is performed for a selected rank indicator larger than 1.

In another embodiment, the determining of the rank indicator is performed for a selected rank indicator equal to 2.

In an embodiment, the determining the rank indicator based on a channel imbalance factor comprises: comparing the channel imbalance factor with a threshold value, and determining the rank indicator to be equal to the selected rank indicator if the channel imbalance factor is equal to or smaller than the threshold value and determining the rank indicator to be equal to one if the channel imbalance factor is larger than the threshold value.

In a variation of the above embodiment, the threshold value is set based on signaling from a base station, based on one or more parameters predefined in the user equipment or based on a combination thereof.

In an embodiment, the channel is denoted by a downlink channel matrix $$H = \begin{pmatrix} h_{11} & h_{12} & \cdots & h_{1Nt} \\ h_{21} & & & \vdots \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station (2) and all the receive antennas at the user equipment (4), $N_t$ is the number of transmit antenna ports of the base station and $N_r$ is the number of receive antennas of the user equipment and the channel imbalance factor CIF is determined by:

$$CIF = 10 \lg \frac{\max_i \|h_i\|}{\min_i \|h_i\|},$$

where $h_i$ is the i-th column of the channel matrix H, and $\|h\|$ is the Frobenius norm of a vector h.

In another embodiment, the channel is denoted by a downlink channel matrix $$H = \begin{pmatrix} h_{11} & h_{12} & \cdots & h_{1Nt} \\ h_{21} & & & \vdots \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station (2) and all the receive antennas at the user equipment (4), $N_t$ is the number of transmit antenna ports of the base station and $N_r$ is the number of receive antennas of the user equipment and the channel imbalance factor (CIF) is determined by:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, and $H^H$ is the Hermitian transposition of H.

In still another embodiment, wherein the channel is denoted by a downlink channel matrix $$H = \begin{pmatrix} h_{11} & h_{12} & \cdots & h_{1Nt} \\ h_{21} & & & \vdots \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station (2) and all the receive antennas at the user equipment (4), $N_t$ is the number of transmit antenna ports of the base station and $N_r$ is the number of receive antennas of the user equipment and the channel imbalance factor CIF is determined by:

$$CIF = \frac{\lambda_{max}(H^H H)}{\lambda_{min}(H^H H)},$$

where $\lambda_{max}(H^H H)$ denotes the maximum eigenvalue of the matrix $H^H H$, and $\lambda_{min}(H^H H)$ denotes the minimum eigenvalue of the matrix $H^H H$.

In an embodiment, the method comprises transmitting the determined rank indicator to the base station.

In a seventh aspect, a user equipment for determining a rank indicator is provided. The user equipment comprises two or more receive antennas for supporting a multi-antenna reception mode and for receiving data on a channel used in communication with a base station. The user equipment comprises a processor arranged to: perform channel measurements for determining a channel matrix; and determine the rank indicator based on a channel imbalance factor, wherein the channel imbalance factor quantifies a difference in receive power of the two or more receive antennas.

In an eight aspect, a computer program for a user equipment for determining a rank indicator is provided. The user equipment comprises two or more receive antennas for supporting a multi-antenna reception mode and for receiving data on a channel used for communication with a base station. The computer program comprises computer program code, which, when run on the user equipment, causes the user equipment to perform the steps of performing channel measurements for determining a channel matrix; and determining the rank indicator based on a channel imbalance factor, wherein the channel imbalance factor quantifies a difference in receive power of the two or more receive antennas.

In a ninth aspect, a computer program product is provided comprising a computer program as above, and a computer readable means on which the computer program is stored.

Further features and advantages of the invention will become clear upon reading the following description and the accompanying drawings.

DETAILED DESCRIPTION

Figure 1:
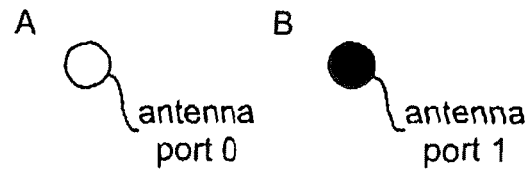
FIG. 1 illustrates an indoor LTE deployment with interleaved antenna ports.
Figure 2A:
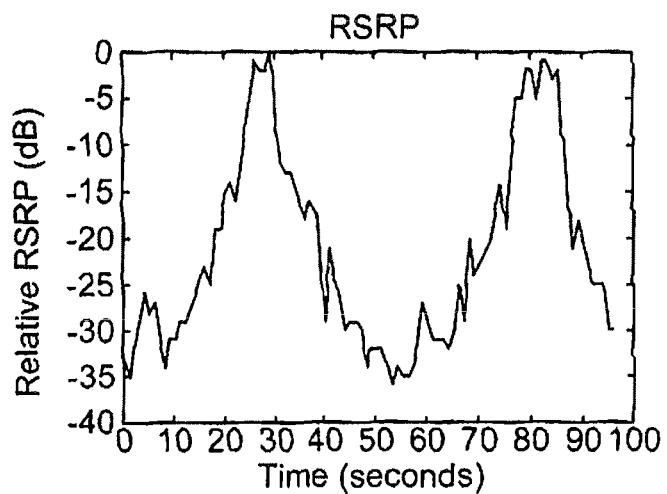
FIGS. 2A and 2B illustrate received signal strength and throughput variations, respectively, for the deployment of FIG. 1.
Figure 2B:
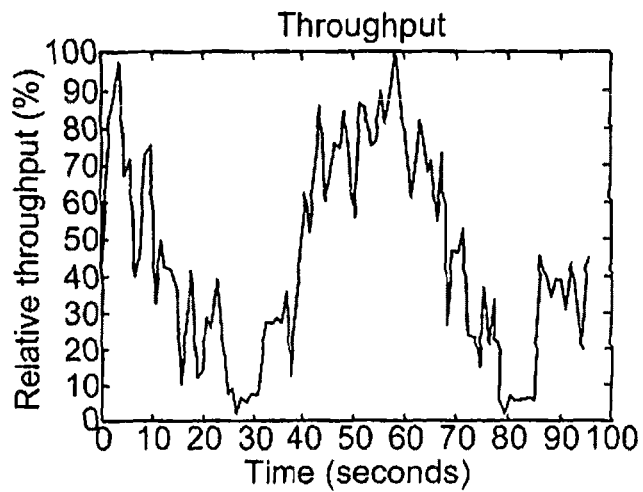

In the following description, for purposes of explanation and not limitation, specific details are set forth such as particular architectures, interfaces, techniques, etc. in order to provide a thorough understanding of the invention. In other instances, detailed descriptions of well-known devices, circuits, and methods are omitted so as not to obscure the description of the invention with unnecessary detail. Like numbers refer to like elements throughout the description.

The invention is in the following described in a communication system conforming to LTE specification, and LTE terminology is therefore used. It is however noted that the teachings herein can be applied generally to MIMO-based systems where geographically separated antennas (or antenna ports) are deployed, for example High Speed Packet Access (HSPA).

Rank selection is proprietary and different user equipment can have different implementations. Among various implementations a simple and common algorithm is to calculate the receiving SINRs based on singular value decomposition (SVD) of the MIMO channel matrix H, and then select the transmission rank that provided the highest throughput. Such rank selection algorithms are effective for most MIMO channels, where the received signal strengths from all transmit antenna ports are almost equal. However, in the interleaved antenna port deployment such rank selection algorithms become problematic. In such a deployment, when a user equipment is close to one site of the interleaved antenna ports scenario, the two antenna ports undergo a very large difference in received power, e.g. in the order of 35 dB, as mentioned in the background section. For such an imbalanced channel, it is reasonable for the user equipment to report rank one, and the resulting performance is expected to be good because of the strong received signal. Measurement results indicate that user equipment may have problem handling this.

A problem that has been identified lies in the improper rank-2 reporting. In the following analysis, it will be showed that rank-2 reporting in such a specific antenna port deployment will inevitably lead to a very low throughput.

The large receive power difference creates a severely imbalanced, i.e. rank-deficient, MIMO channel and rank-1 reporting would be more reasonable. Nevertheless, using the rank selection algorithm as described above, rank 2 is preferred because according to the calculation, rank 2 provides a throughput higher than rank 1: the stream corresponding to the sub-channel with the larger eigenvalue can easily support the highest Modulation and Coding Scheme (MCS), even when half of the transmit power is reallocated to the weak stream rank 2 is still preferred. Rank-2 is therefore reported by the user equipment for most of the time.

In the following, it is showed that the improper rank-2 reporting leads to an extremely low throughput.

Consider a generic receiver with a zero-forcing (ZF) spatial equalizer. The output signal-to-noise ratio (SNR) of the $k^{th}$ stream in a 2×2 antenna configuration (2 transmit antennas×2 receive antennas) can be expressed as:

$$\gamma_k = \frac{P_t/2}{\left\{\left[W^H \begin{pmatrix} \sqrt{p_0} & 0 \\ 0 & \sqrt{p_1} \end{pmatrix} \overline{H}^H \overline{H} \begin{pmatrix} \sqrt{p_0} & 0 \\ 0 & \sqrt{p_1} \end{pmatrix} W\right]^{-1}\right\}_{k,k}}, \quad \text{(eq. 1)}$$

$$k = 1, 2$$

where $P_t$ is the total transmit power (normalized by noise and interference) of the two antenna ports, W is the unitary precoding matrix in transmission mode 2 or mode 4 [refer to 3GPP TS 36.211 for different transmission modes], $$H = \overline{H} \begin{pmatrix} \sqrt{p_0} & 0 \\ 0 & \sqrt{p_1} \end{pmatrix}$$

is the 2×2 MIMO channel matrix, where $\overline{H}$ is the balance MIMO channel matrix, $p_0$ and $p_1$ are the channel gain (including path loss etc.) of antenna port 0 and antenna port 1, respectively. k=1,2 denotes the index of the first or second stream. When the user equipment is experiencing an extremely imbalanced channel, such imbalance can be modeled as $p_0 \gg p_1$. In this context, the output-SNR can be rewritten as $$\gamma_k \approx \frac{p_1}{\overline{h}_{2,2}} \frac{P_t/2}{\{w_2 w_2^H\}_{k,k}}, \quad k = 1, 2 \quad \text{(eq. 2)}$$

where $w_2$ is the second column of the matrix $W^H$. From equation (2), it is clear that the output-SNRs of both streams are proportional to the very small value, $p_1$, which means both streams have very low output SNR and can not be correctly decoded.

Thus, rank-selection algorithms originally designed for balanced MIMO channels are not suitable for highly imbalanced channels like the interleaved antenna port deployment. The improper rank reporting will cause an extremely severe degradation in the system throughput. For this reason, it is especially important to ensure a correct and reasonable user equipment behaviour on rank reporting. Although eNode B can simply override the rank recommendation of the user equipment via outer-loop link adaptation, in usual cases, it takes quite a long time for the eNode B to make a correct decision on transmission rank. Embodiments of the invention provide, in different aspects, an improvement in this regards.

Briefly, methods and devices are provided to improve the rank determination based on a channel imbalance check. Various criteria for judging the channel's unbalancing degree are also provided.

Figure 3:
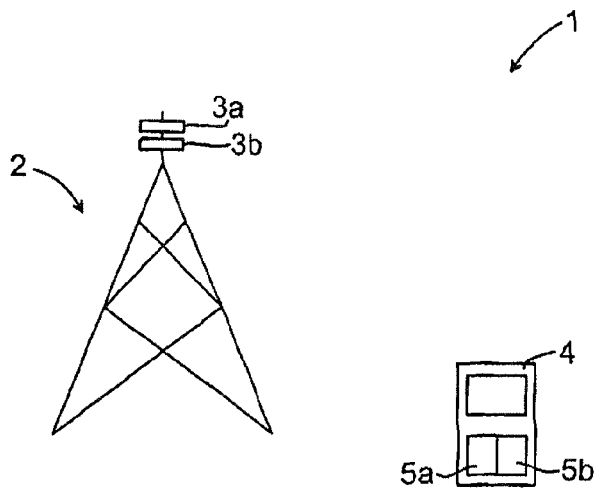
FIG. 3 illustrates schematically an environment in which embodiments of the invention may be implemented.

FIG. 3 illustrates schematically an environment in which embodiments may be implemented. A communication system 1 is illustrated comprising a base station 2, e.g. evolved Node B in LTE, also denoted eNB, arranged to communicate with user equipment 4 using radio frequency transmitter(s) and receiver(s), for example utilizing multiple-input multiple-output (MIMO) antenna technology. The base station 2 comprises at least two transmit antenna ports 3a, 3b, typically more. Although not illustrated in the figure, the transmit antenna ports 3a, 3b may be geographically separated antenna ports, and the invention may be implemented for interleaved antenna deployment as well as other types of deployment.

The user equipment 4 comprises two or more receive antennas 5a, 5b for supporting a multi-antenna reception mode and for receiving data on a channel used in communication with the base station 2.

A rank indicator indicates the number of spatial multiplexing layers that can be supported by the current channel experienced at the user equipment 4. Stated differently, the rank indicator indicates the number of spatial multiplexing layers that is calculated by the user equipment to be the best number, and is thus recommended by the user equipment 4.

The transmission rank defines the number of spatial multiplexing layers that the base station 2 transmits in communication with the user equipment 4.

To quantify the extent of the channel imbalance, we introduce a new quantity, channel imbalanced factor, CIF, which can be defined as follows. In general, the more a channel is imbalanced, the higher its CIF will be.

Definition 1: Norm Criterion $$CIF(H) = 10 \log \frac{\max_i \|h_i\|}{\min_i \|h_i\|} \quad (\text{eq. 3})$$

where $h_i$ is the i-th column of the MIMO channel matrix H, and $\|h\|$ is the length (i.e., 2-norm) of a vector h.

Definition 2: Trace-Determinant Criterion $$CIF(H) = \frac{tr(H^H H)}{\det(H^H H)} \quad (\text{eq. 4})$$

where tr(•) denotes the trace of a matrix (i.e., the sum of its the diagonal elements), and det(•) denotes the determinant of the matrix, and $H^H$ is the Hermitian transposition of H.

Definition 3: Eigenvalue Criterion $$CIF(H) = \frac{\lambda_{max}(H^H H)}{\lambda_{min}(H^H H)} \quad (\text{eq. 5})$$

where $\lambda_{max}$ (•) denotes the maximum eigenvalue of a matrix, and $\lambda_{min}$ (•) denotes the (non-zero) minimum eigenvalue.

In the definitions above, the parameter H input to the function CIF(.) is the channel matrix on a particular sub-carrier or sub-band. If a wide-band channel imbalance factor is desired, the sub-band channel can be averaged, to obtain the imbalance factor for the entire bandwidth of interest.

It should be noted that all the definitions are generally applicable to geographically separated antenna deployment with multiple transmit antenna ports (equal to or greater than two ports) e.g. 4 or 8 antenna ports, although in the present description a 2-port case is used for exemplifying.

Figure 4:
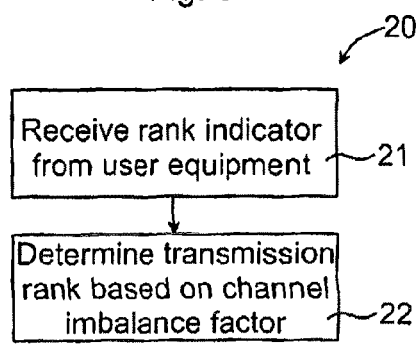
FIG. 4 illustrates a flow chart over steps of a method in a base station in accordance with an embodiment.

FIG. 4 illustrates a flow chart over steps of a method in accordance with an embodiment. The method 20 is implemented in the base station 2 for determining a transmission rank. As described in relation to FIG. 3, the base station 2 controls two or more transmit antenna ports 3a, 3b for being able to support a multi-antenna transmission mode and for transmission of data on a channel for communication with the user equipment 4. The method 20 comprises receiving 21 a rank indicator from a user equipment 4, the rank indicator indicating the number of spatial multiplexing layers recommended by the user equipment 4.

The method 20 further comprises determining 22 the transmission rank based on the channel imbalance factor CIF. The channel imbalance factor CIF quantifies a difference in receive power of the two or more transmit antenna ports 3a, 3b, as described earlier.

In an embodiment, the determining of the transmission rank based on a channel imbalance factor CIF is performed for a received rank indicator larger than 1. In a particular embodiment, the determining of the transmission rank based on a channel imbalance factor CIF is performed for a received rank indicator equal to 2. The determining of transmission rank may thus always be performed, irrespective of the received rank indicator, or be performed for specified rank indicators.

The rank reporting from the user equipment 2 is thus checked for correctness by taking into account channel imbalance. The channel imbalance factor CIF can be obtained e.g. via uplink channel parameters and used for checking the correctness of the rank report from the user equipment 4, by comparing the CIF with an unbalancing threshold $\Gamma_{th}$. The difference in receive power, i.e. channel imbalance information can be obtained in various ways, e.g. per antenna port reference signal received power (RSRP) measurements and reports or uplink channel measurements. In an embodiment, the CIF is calculated by the user equipment 4 and signalled to the base station 2.

In an embodiment, the determining 22 of the transmission rank based on a channel imbalance factor CIF comprises:

comparing the channel imbalance factor CIF with a threshold value $\Gamma_{th}$, and determining the transmission rank to be equal to the received rank indicator if the channel imbalance factor CIF is equal to or smaller than the threshold value $\Gamma_{th}$ and determining the transmission rank to be equal to one if the channel imbalance factor CIF is larger than the threshold value $\Gamma_{th}$.

It is noted that the invention is not restricted to determining the transmission rank to be equal to one if the channel imbalance factor CIF is larger than the threshold value $\Gamma_{th}$. In other embodiments, the transmission rank may be set to another value besides 1, as in the above embodiment. However, it can be shown that, if one antenna port is weaker (in terms of received signal strength) than the others, the overall throughput performance will be deteriorated by this weakest antenna port, regardless of the transmission rank (2, 3, 4, etc.). However, for rank-1 transmission, one can prove that the overall throughput is dominated by the strongest antenna port rather than the weakest antenna port. As a result, setting the transmission rank to 1 is often more suitable than setting the transmission rank to other values, and transmission rank-1 overriding is suitable even in the case of a received rank indicator of 4.

The threshold value $\Gamma_{th}$ may be set based on a probability that the transmission rank would give sufficiently high data throughput. The probability in turn may be determined by simulation of a communication system 1 comprising the base station 2. This is explained more in detail with reference to FIG. 5.

In an embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column of the matrix H represents the channel between the i-th transmit antenna at the user equipment 4 and all the receive antennas at the base station 2, $N_t$ is the number of user equipment transmit antennas, $N_r$ is the number of base station receive antennas and the channel imbalance factor CIF is determined in accordance with definition 1 (norm criterion), eq. 3, described earlier:

$$CIF = 101 g \frac{\max_i \|h_i\|}{\min_i \|h_i\|},$$

where $h_i$ is the i-th column of the uplink channel matrix H, and $\|h\|$ is the Frobenius norm of a vector h.

In another embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column of the matrix H represents the channel between the i-th transmit antenna at the user equipment 4 and all the receive antennas at the base station 2, $N_t$ is the number of user equipment transmit antennas, $N_r$ is the number of base station receive antennas, and the channel imbalance factor (CIF) is determined in accordance with definition 2 (trace-determinant criterion), eq. 4, described earlier:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, and $H^H$ is the Hermitian transposition of H.

In another embodiment, the channel is denoted by an uplink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column of the matrix H represents the channel between the i-th transmit antenna at the user equipment 4 and all the receive antennas at the base station 2, $N_t$ is the number of user equipment transmit antennas, $N_r$ is the number of base station receive antennas, and the channel imbalance factor (CIF) is determined in accordance with definition 3 (eigenvalue criterion), eq. 5, described earlier:

$$CIF = \frac{\lambda_{max}(H^H H)}{\lambda_{min}(H^H H)},$$

where $\lambda_{max}(H^H H)$ denotes the maximum eigenvalue of the matrix $H^H H$, and $\lambda_{min}(H^H H)$ denotes the minimum eigenvalue of the matrix $H^H H$.

In a variation of the various embodiments as described, the method further comprises, performing channel measurements for determining the uplink channel matrix H. The channel measurements are then performed prior to the determining of transmission rank.

In a variation of the various embodiments described, the method further comprises utilizing the determined transmission rank in communication with the user equipment 4. That is, the base station 2 utilizes the transmission rank as determined, the transmission rank possibly being modified compared to the number of spatial multiplexing layers as indicated by the rank indicator.

Figure 5:
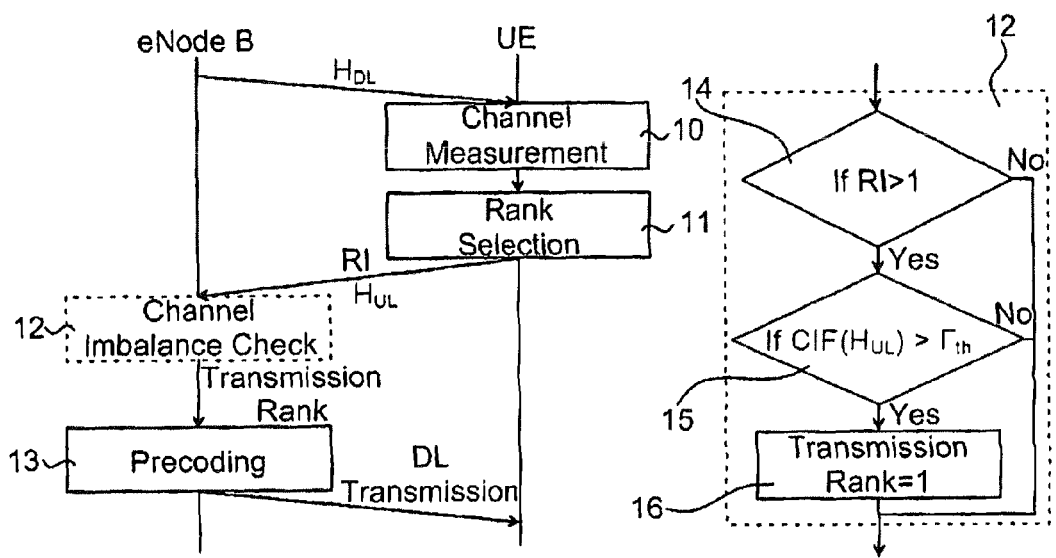
FIG. 5 is a sequence diagram illustrating determination of transmission rank.

FIG. 5 is a sequence diagram illustrating determination of the transmission rank according to some embodiments. The base station 2 transmits on a downlink channel (illustrated at arrow denoted $H_{DL}$). The user equipment 4 performs channel measurements on the downlink channel (box 10) and makes a rank selection (box 11). The user equipment 4 then reports the rank selection by transmitting a rank indicator in an uplink channel (illustrated at arrow denoted RI, $H_{UL}$). The base station 2 performs the channel imbalance check (box 12), providing an output in the form of a transmission rank (illustrated at arrow denoted transmission rank). The transmission rank is input to a pre-coding unit (box 13), and used in conventional manner for downlink transmission (illustrated at arrow denoted DL transmission). For example, if the output transmission rank equals 2, then two spatial multiplexing layers (i.e. transmission rank 2) are used in the downlink transmission.

Box 12 is illustrated more in detail in the rightmost dotted box. It is first determined whether the rank indicator is greater than 1, if not (i.e. if the rank indicator equals 1), then the channel imbalance check is finished (see arrow from box 14 indicated "no") and the rank indicator output equals 1. If however the rank indicator is larger than 1, e.g. equal to 2, then the channel imbalance check is performed (see arrow from box 14 indicated "yes"). In such case, the following is performed (box 15):

If CIF<=$\Gamma_{th}$, the base station 2 will follow the rank report as the user equipment 4 behavior is believed to be reasonable (arrow from box 15 indicated "No").

If CIF>$\Gamma_{th}$, the base station 2 will override the rank-2 report received from the user equipment 4 to rank 1, since the user equipment's 4 behavior is considered unreasonable (arrow from box 15 indicated "Yes"). The transmission rank is thus set to 1 (box 16) and transmission rank 1 is output to the pre-coding unit (box 13).

The value of the threshold $\Gamma_{th}$ is set to meet the target probability of detection, as well as the target probability of false alarm. A large $\Gamma_{th}$ leads to a low probability of detection, while a small $\Gamma_{th}$ results in a high probability of false alarm. Here, the event of detection comprises: the channel is imbalanced, and such imbalance is detected correctly. The event of false alarm comprises: the channel is indeed balanced, but still detected as imbalanced.

In general, the threshold $\Gamma_{th}$ is a value that can be determined and possibly optimized e.g. via simulations and/or measurements.

It is also noted that the invention is not restricted to the described 2×2 system. Indeed, it is generally applicable to MIMO systems with at least two geographically separated transmit antennas (or antenna ports), and may for example be extended to cover a 4-antenna-port case by rewriting the first condition in 14 as "RI>=2".

Figure 6:
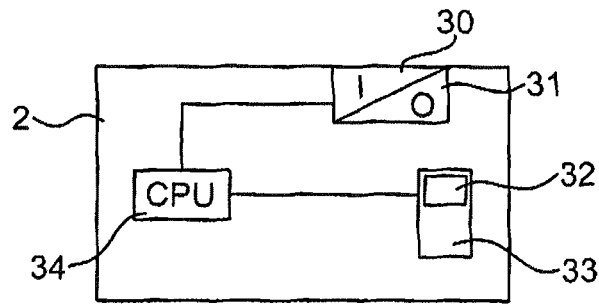
FIG. 6 illustrates means in a base station for implementing methods of FIG. 4-5.

In another aspect, and with reference to FIG. 6, a base station 2 for determining a transmission rank is provided. The base station 2 comprises a processor 34 for controlling two or more transmit antenna ports 3a, 3b for supporting a multi-antenna transmission mode and for transmission of data on a channel for communication with the user equipment 4. The processor 34, e.g. a central processing unit, microcontroller, digital signal processor (DSP), etc., capable of executing software instructions stored in a computer program product 32 e.g. in the form of a memory. The processor 34 is connected to a receiver 30 that receives inputs from user equipment 5. The receiver 30 in turn is connected to physical antennas. It is noted that although only one processor 34 is illustrated in FIG. 6, the implementation may comprise distributed hardware so that several CPUs are used rather than one when running the software. Likewise, although only one input device 30 is illustrated, there may be several input devices, e.g. one input device handling inputs from base stations and another input device handling inputs from user equipment.

The described methods and algorithms or parts thereof for use in handling handover may be implemented e.g. by software and/or application specific integrated circuits in the processor 34. To this end, the base station 2 may further comprise the computer program 32 stored on a computer program product 33.

The receiver 30 is configured to receive a rank indicator from a user equipment 4. As before, the rank indicator indicates the number of spatial multiplexing layers recommended by the user equipment 4.

The processor 34 is further configured to determine the transmission rank based on a channel imbalance factor CIF, wherein the channel imbalance factor CIF quantifies a difference in receive power of the two or more transmit antenna ports 3a, 3b.

In an embodiment, the base station 2 is arranged to signal the threshold value $\Gamma_{th}$ to the user equipment 4. Such information may be dedicated to the user equipment 4 via higher-layer signaling, e.g. RRC signaling, which may be performed prior to any rank reporting or downlink transmission.

With reference still to FIG. 6, the invention also encompasses a computer program 32 for determining a transmission rank. The computer program 32 comprises computer program code which when run on the base station 2, and in particular the processor 34 thereof, causes the base station 2 to perform the methods as described.

A computer program product 33 is also provided comprising the computer program 32 and computer readable means on which the computer program 32 is stored. The computer program product 33 may be any combination of read and write memory (RAM) or read only memory (ROM). The computer program product 33 may also comprise persistent storage, which, for example can be any single one or combination of magnetic memory, optical memory, or solid state memory.

Figure 7A:
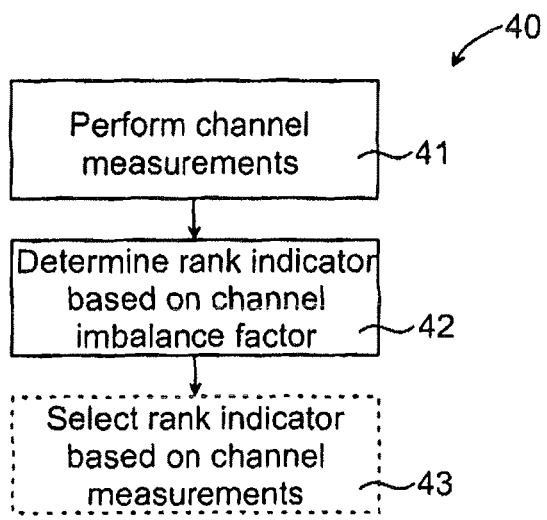
FIG. 7a illustrates a flow chart over steps of a method in a user equipment in accordance with an embodiment.

In still another aspect, and with reference to FIG. 7a, a method 40 in a user equipment 4 for determining a rank indicator is provided. The user equipment 4 comprises two or more receive antennas 5a, 5b for supporting a multi-antenna reception mode and for receiving data on a channel used in communication with a base station 2. The method 40 comprises performing 41 channel measurements for determining a downlink channel matrix H. This can be done in conventional manner, adapted in accordance with the communication system 1 in question.

The method 40 further comprises determining 42 the rank indicator based on a channel imbalance factor CIF, wherein the channel imbalance factor CIF quantifies a difference in receive power of the two or more receive antennas 5a, 5b.

The method 40 may further comprise selecting 43 a rank indicator based on the determined downlink channel matrix H, wherein the rank indicator indicates a number of spatial multiplexing layers of recommended by the user equipment 4. This can also be performed in conventional manner depending on the communication system 1 in question. The selecting 43 may for example be performed if the channel imbalance factor CIF indicates that the difference in receive power is below a certain threshold value. As another example, the selecting 43 may be performed prior to determining 42 the rank indicator (see also FIG. 7b).

Figure 7B:
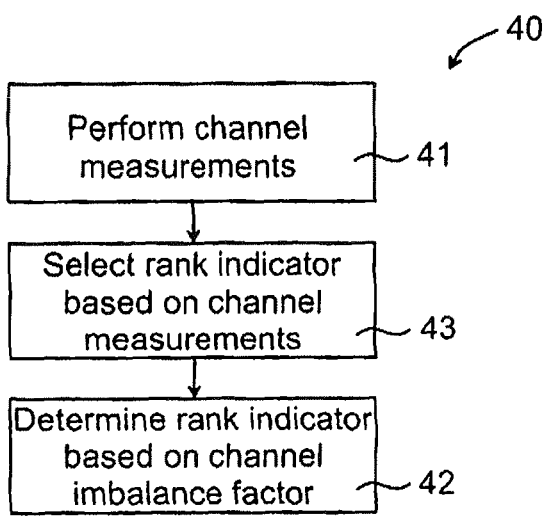
FIG. 7b illustrates a flow chart over steps of a method in a user equipment in accordance with another embodiment.

FIG. 7b illustrates a variation of the method of FIG. 7a. The method 40' then comprises the step of performing 41 channel measurements for determining a downlink channel matrix H, as in the method of FIG. 7a. Again, this can be done in conventional manner, adapted in accordance with the communication system 1 in question.

The method 40' further comprises selecting 43 a rank indicator based on the determined downlink channel matrix H, wherein the rank indicator indicates a number of spatial multiplexing layers of recommended by the user equipment 4. This can also be performed in conventional manner depending on the communication system 1 in question.

The method 40' further comprises determining 42 the rank indicator based on a channel imbalance factor CIF, wherein the channel imbalance factor CIF quantifies a difference in receive power of the two or more receive antennas 5a, 5b.

For the embodiments of FIGS. 7a and 7b, the channel imbalance information may be obtained e.g. as measured by the user equipment 4 via per antenna port channel estimation.

The determining 42 of the rank indicator may be performed for a selected rank indicator larger than 1. In a particular embodiment, the determining of the rank indicator is performed for a selected rank indicator equal to 2.

In an embodiment, the determining 42 of the rank indicator based on a channel imbalance factor CIF comprises comparing the channel imbalance factor CIF with a threshold value $\Gamma_{th}$, and determining the rank indicator to be equal to the selected rank indicator if the channel imbalance factor CIF is equal to or smaller than the threshold value $\Gamma_{th}$ and determining the rank indicator to be equal to one if the channel imbalance factor CIF is larger than the threshold value $\Gamma_{th}$.

The threshold value $\Gamma_{th}$ may be set based on signaling from a base station 2, based on one or more parameters predefined in the user equipment 4 or based on a combination thereof.

In an embodiment, the channel is denoted by a downlink channel matrix $$H = \begin{pmatrix} h_{11} & h_{12} & \ldots & h_{1Nt} \\ h_{21} & & & \\ \vdots & & \ddots & \vdots \\ h_{Nr1} & h_{Nr2} & \ldots & h_{NrNt} \end{pmatrix}$$

where the i-th column of the matrix H represents the channel between the i-th antenna port at the base station 2 and all the receive antennas at the user equipment 4, $N_t$ is the number of transmit antenna ports of the base station and $N_r$ is the number of receive antennas of the user equipment, and the channel imbalance factor CIF is determined in accordance with definition 1 (norm criterion), eq. 3, described earlier:

$$CIF = 10 \lg \frac{\max_i \|h_i\|}{\min_i \|h_i\|},$$

where $h_i$ is the i-th column of the channel matrix H, and $\|h\|$ is the Frobenius norm of a vector h.

In another embodiment, the channel is denoted by a downlink channel matrix $$H = \begin{pmatrix} h_{11} & h_{12} & \cdots & h_{1Nt} \\ h_{21} & & & \vdots \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station 2 and all the receive antennas at the user equipment 4, $N_t$ is the number of transmit antenna ports of the base station and $N_r$ is the number of receive antennas of the user equipment, and the channel imbalance factor (CIF) is determined in accordance with definition 1 (trace-determinant criterion), eq. 4, described earlier:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, $H^H$ is the Hermitian transposition of H.

In still another embodiment, the channel is denoted by a downlink channel matrix $$H = \begin{pmatrix} h_{11} & h_{12} & \cdots & h_{1Nt} \\ h_{21} & & & \vdots \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station 2 and all the receive antennas at the user equipment 4, $N_t$ is the number of transmit antenna ports of the base station and $N_r$ is the number of receive antennas of the user equipment, and the channel imbalance factor CIF is determined in accordance with definition 1 (eigenvalue criterion), eq. 5, described earlier:

$$CIF = \frac{\lambda_{max}(H^H H)}{\lambda_{min}(H^H H)},$$

where $\lambda_{max}(H^H H)$ denotes the maximum eigenvalue of the matrix $H^H H$, $\lambda_{min}(H^H H)$ denotes the minimum eigenvalue of the matrix $H^H H$.

Figure 8:
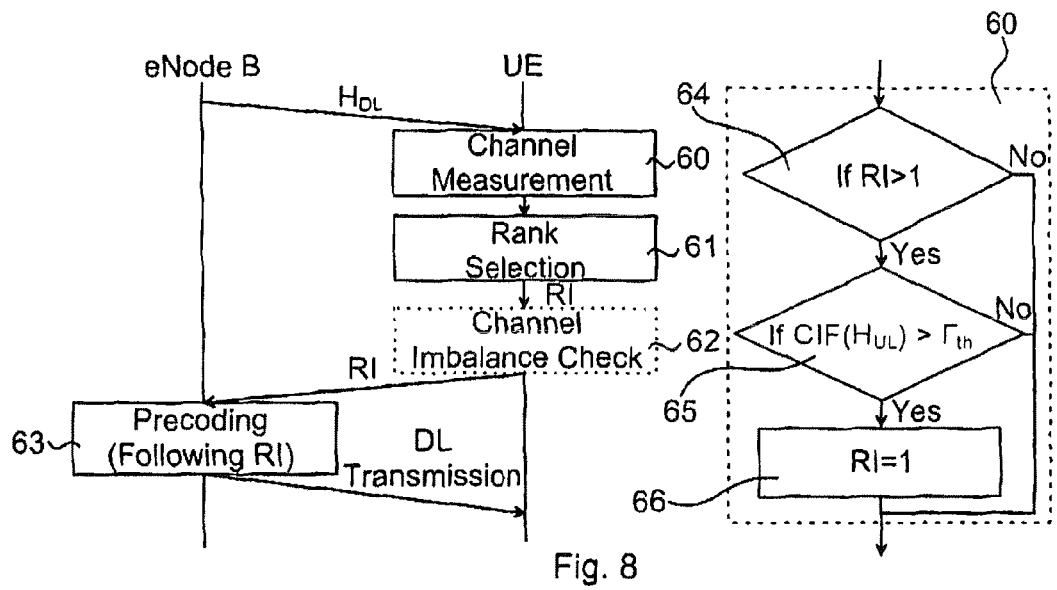
FIG. 8 is a sequence diagram illustrating determination of the rank indicator in the user equipment.

FIG. 8 is a sequence diagram illustrating determination of the rank indicator in the user equipment. The base station 2 transmits a downlink channel (illustrated at arrow denoted $H_{DL}$). The user equipment 4 performs channel measurements on the downlink channel (box 60) and makes a rank selection (box 61). The output from box 61, a rank indicator, is input to a channel imbalance check (box 62) performed by the user equipment 4. The channel imbalance check will check whether the user equipment 4 behavior in rank calculation and reporting is correct or not and provides as output a possibly altered rank indicator. This rank indicator is transmitted to the base station 2 (illustrated at arrow denoted RI). The rank indicator is input to a pre-coding unit (box 63), and used in conventional manner for downlink transmission (illustrated at arrow denoted DL transmission). For example, if the output rank indicator equals 2, a transmission rank of 2 is selected and then two spatial multiplexing layers are used in the downlink transmission.

Box 62 is illustrated more in detail in the rightmost dotted and enlarged box 62. It is first determined whether the rank indicator is greater than 1, if not (i.e. if the rank indicator equals 1), then the channel imbalance check is finished (see arrow from box 64 indicated "no") and the rank indicator output is 1. If however the rank indicator is larger than 1, then the channel imbalance check is performed (see arrow from box 63 indicated "yes"). In such case, the following is performed (box 65):

If $CIF<=\Gamma_{th}$, the user equipment 4 will follow the normal rank calculation and reporting (arrow from box 65 indicated "No").

If $CIF>\Gamma_{th}$, the user equipment 4 will override the calculated rank-2 report to rank 1, in the case that rank-2 is selected after normal calculation (arrow from box 65 indicated "Yes"). The rank indicator is thus set to 1 (box 66) and signaled to the base station 2 (arrow denoted RI). In the base station 2, the rank indicator is provided to a pre-coding unit (box 63), and used in downlink transmission (arrow denoted DL transmission).

The value of the threshold $\Gamma_{th}$ may be derived based on signaling from the base station 2, based on parameters predefined in the user equipment 4 or a combination thereof.

The value of such parameters may for example be obtained via simulation, measurement, etc.

After having determined the rank indicator, the user equipment 4 may transmit the determined rank indicator to the base station 2.

It is again noted that the invention is not restricted to the described 2×2 system. Indeed, it is generally applicable to MIMO systems with at least two geographically separated transmit antennas (or antenna ports), and may for example be extended to cover a 4-antenna-port case by rewriting the first condition in 64 as "RI>=2".

Figure 9:
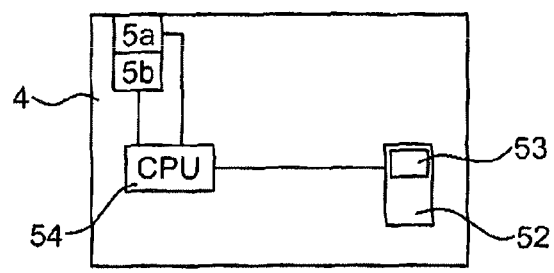
FIG. 9 illustrates means in the first base station for implementing methods of FIGS. 7-8.

In another aspect, and with reference to FIG. 9, a user equipment 4 for determining a rank indicator is provided. The user equipment 4 comprises two or more receive antennas 5a, 5b for supporting a multi-antenna reception mode and for receiving data on a channel used in communication with a base station 2. The user equipment 4 further comprises a processor 54 arranged to effectuate the methods as described above. The processor 54 comprises e.g. a central processing unit, microcontroller, digital signal processor (DSP), etc., capable of executing software instructions stored in a computer program product 52 e.g. in the form of a memory. The processor 54 is connected to receiver antennas 5a, 5b receiving input from the base station 2. In particular, the processor 54 is arranged to: perform channel measurements for determining a channel matrix H; and determine, for a selected rank indicator larger than 1, the rank indicator based on a channel imbalance factor CIF, wherein the channel imbalance factor CIF quantifies a difference in receive power of the two or more receive antennas 5a, 5b.

The processor may be arranged to perform various steps of the methods as described, e.g. arranged to select a rank indicator based on the determined channel matrix H, wherein the rank indicator indicates a number of spatial multiplexing layers recommended by the user equipment With reference still to FIG. 9, a computer program 53 for a user equipment 4 as described for determining a rank indicator is provided. The computer program 32 comprises computer program code, which, when run on the user equipment 4, causes the user equipment 4 to perform the steps of the methods as described. In particular, when the computer program code is run on the user equipment 4, the user equipment 4 is caused to perform: channel measurements for determining a channel matrix H and determining, for a selected rank indicator larger than 1, the rank indicator based on a channel imbalance factor CIF, wherein the channel imbalance factor CIF quantifies a difference in receive power of the two or more receive antennas 5a, 5b.

A computer program product 53 comprising a computer program 52 as described above is also provided, and a computer readable means on which the computer program 52 is stored. The computer program product 53 may be any combination of read and write memory (RAM) or read only memory (ROM). The computer program product 53 may also comprise persistent storage, which, for example may be any single one or combination of magnetic memory, optical memory, or solid state memory.

The invention claimed is:

1. A method in a base station for determining a transmission rank, the base station controlling two or more transmit antenna ports for supporting a multi-antenna transmission mode and for transmission of data on a channel for communication with a user equipment, the method comprising:
receiving a rank indicator from a user equipment, the rank indicator indicating the number of spatial multiplexing layers recommended by the user equipment, and
determining the transmission rank based on a channel imbalance factor CIF, wherein the channel imbalance factor CIF quantifies a difference in receive power of the two or more transmit antenna ports.

2. The method as claimed in claim 1, wherein the determining of the transmission rank based on a channel imbalance factor CIF is performed for a received rank indicator larger than 1.

3. The method as claimed in claim 1, wherein the determining of the transmission rank based on a channel imbalance factor CIF is performed for a received rank indicator equal to 2.

4. The method as claimed in claim 1, wherein the determining of the transmission rank based on a channel imbalance factor CIF comprises:
comparing the channel imbalance factor CIF with a threshold value $\Gamma_{th}$, and
determining the transmission rank to be equal to the received rank indicator if the channel imbalance factor CIF is equal to or smaller than the threshold value $\Gamma_{th}$ and determining the transmission rank to be equal to one if the channel imbalance factor CIF is larger than the threshold value $\Gamma_{th}$.

5. The method as claimed in claim 4, wherein the threshold value $\Gamma_{th}$ is set based on a probability that the transmission rank would give high data throughput.

6. The method as claimed in claim 5, wherein the probability is determined by simulation in a communication system comprising the base station.

7. The method as claimed in claim 1, wherein the channel is denoted by an uplink channel matrix $$H = \begin{pmatrix} h_{11} & h_{12} & \ldots & h_{1N_t} \\ h_{21} & & & \\ \vdots & & \ddots & \vdots \\ h_{N_r 1} & h_{N_r 2} & \ldots & h_{N_r N_t} \end{pmatrix}$$

where the i-th column represents the channel between the i-th transmit antenna at the user equipment and all the receive antennas at the base station, $N_t$ is the number of transmit antennas of the user equipment and $N_r$ is the number of receive antennas of the base station, and the channel imbalance factor CIF is determined by:

$$CIF = 10 \lg \frac{\max_i \|h_i\|}{\min_i \|h_i\|},$$

where $h_i$ is the i-th column of the uplink channel matrix H, and $\|h\|$ is the Frobenius norm of a vector h.

8. The method as claimed in claim 1, wherein the channel is denoted by an uplink channel matrix $$H = \begin{pmatrix} h_{11} & h_{12} & \ldots & h_{1N_t} \\ h_{21} & & & \\ \vdots & & \ddots & \vdots \\ h_{N_r 1} & h_{N_r 2} & \ldots & h_{N_r N_t} \end{pmatrix}$$

and the channel imbalance factor (CIF) is determined by:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, and $H^H$ is the Hermitian transposition of H, $N_t$ is the number of transmit antennas of the user equipment and $N_r$ is the number of receive antennas of the base station.

9. The method as claimed in claim 1, wherein the channel is denoted by an uplink channel matrix $$H = \begin{pmatrix} h_{11} & h_{12} & \ldots & h_{1N_t} \\ h_{21} & & & \\ \vdots & & \ddots & \vdots \\ h_{N_r 1} & h_{N_r 2} & \ldots & h_{N_r N_t} \end{pmatrix}$$

where the i-th column represents the channel between the i-th transmit antenna at the user equipment and all the receive antennas at the base station, $N_t$ is the number of transmit antennas of the user equipment and $N_r$ is the number of receive antennas of the base station, and the channel imbalance factor, CIF, is determined by:

$$CIF = \frac{\lambda_{max}(H^H H)}{\lambda_{min}(H^H H)},$$

where $\lambda_{max}(H^H H)$ denotes the maximum eigenvalue of the matrix $H^H H$, and $\lambda_{min}(H^H H)$ denotes the minimum eigenvalue of the matrix $H^H H$, $N_t$ is the number of transmit antennas of the user equipment and $N_r$ is the number of receive antennas of the base station.

10. The method as claimed in claim 1, further comprising, prior to the determining of transmission rank, performing channel measurements for determining the uplink channel matrix H.

11. The method as claimed in claim 1, further comprising utilizing the determined transmission rank in communication with the user equipment.

12. A base station for determining a transmission rank, the base station comprising a processor for controlling two or more transmit antenna ports for supporting a multi-antenna transmission mode and for transmission of data on a channel for communication with a user equipment, the base station comprising:
a receiver configured to receive a rank indicator from a user equipment, the rank indicator indicating the number of spatial multiplexing layers recommended by the user equipment, and
a processor configured to determine, for a received rank indicator larger than 1, the transmission rank based on a channel imbalance factor CIF, wherein the channel imbalance factor CIF quantifies a difference in receive power of the two or more transmit antenna ports.

13. A computer program for a base station for determining a transmission rank, the base station controlling two or more transmit antenna ports for supporting a multi-antenna transmission mode and for transmission of data on a channel for communication with a user equipment, the computer program comprising computer program code stored on a non-trans memory, which, when executed by a processor of the base station, causes the base station to:
receive a rank indicator from a user equipment, the rank indicator indicating the number of spatial multiplexing layers supported by the user equipment, and
determine, for a received rank indicator larger than 1, the transmission rank based on a channel imbalance factor CIF, wherein the channel imbalance factor CIF quantifies a difference in receive power of the two or more transmit antenna ports.

14. A method in a user equipment for determining a rank indicator, the user equipment comprising two or more receive antennas for supporting a multi-antenna reception mode and for receiving data on a channel used in communication with a base station, the method comprising:
performing channel measurements for determining a downlink channel matrix H, and
determining the rank indicator based on a channel imbalance factor CIF, wherein the channel imbalance factor CIF quantifies a difference in receive power of the two or more receive antennas.

15. The method as claimed in claim 14, comprising selecting a rank indicator based on the determined downlink channel matrix H, wherein the rank indicator indicates a number of spatial multiplexing layers of recommended by the user equipment.

16. The method as claimed in claim 15, wherein the determining the rank indicator is performed for a selected rank indicator larger than 1.

17. The method as claimed in claim 15, wherein the determining the rank indicator is performed for a selected rank indicator equal to 2.

18. The method as claimed in claim 15, wherein the determining of the rank indicator based on a channel imbalance factor CIF comprises:
comparing the channel imbalance factor CIF with a threshold value $\Gamma_{th}$, and
determining the rank indicator to be equal to the selected rank indicator if the channel imbalance factor CIF is equal to or smaller than the threshold value $\Gamma_{th}$ and determining the rank indicator to be equal to one if the channel imbalance factor CIF is larger than the threshold value $\Gamma_{th}$.

19. The method as claimed in claim 18, wherein the threshold value $\Gamma_{th}$ is set based on signaling from a base station, based on one or more parameters predefined in the user equipment or based on a combination thereof.

20. The method as claimed in claim 14, wherein the channel is denoted by a downlink channel matrix $$H = \begin{pmatrix} h_{11} & h_{12} & \cdots & h_{1Nt} \\ h_{21} & & & \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station and all the receive antennas at the user equipment $N_t$ is the number of transmit antenna ports of the base station and $N_r$ is the number of receive antennas of the user equipment, and the channel imbalance factor CIF is determined by:

$$CIF = 10 \lg \frac{\max_i \|h_i\|}{\min_i \|h_i\|},$$

where $h_i$ is the i-th column of the channel matrix H, and $\|h\|$ is the Frobenius norm of a vector h.

21. The method as claimed in claim 14, wherein the channel is denoted by a downlink channel matrix $$H = \begin{pmatrix} h_{11} & h_{12} & \cdots & h_{1Nt} \\ h_{21} & & & \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station and all the receive antennas at the user equipment $N_t$ is the number of transmit antenna ports of the base station and $N_r$ is the number of receive antennas of the user equipment, and the channel imbalance factor (CIF) is determined by:

$$CIF = \frac{tr(H^H H)}{\det(H^H H)},$$

where $tr(H^H H)$ denotes the trace of the matrix $H^H H$ and $\det(H^H H)$ denotes the determinant of the matrix $H^H H$, and $H^H$ is the Hermitian transposition of H.

22. The method as claimed in claim 14, wherein the channel is denoted by a downlink channel matrix $$H = \begin{pmatrix} h_{11} & h_{12} & \cdots & h_{1Nt} \\ h_{21} & & & \\ \vdots & & \ddots & \vdots \\ h_{Nr1} & h_{Nr2} & \cdots & h_{NrNt} \end{pmatrix}$$

where the i-th column of the matrix H represents the channel between the i-th antenna port at the base station and all the receive antennas at the user equipment $N_t$ is the number of transmit antenna ports of the base station and $N_r$ is the number of receive antennas of the user equipment, and the channel imbalance factor CIF is determined by:

$$CIF = \frac{\lambda_{max}(H^H H)}{\lambda_{min}(H^H H)},$$

where $\lambda_{max}(H^H H)$ denotes the maximum eigenvalue of the matrix $H^H H$, and $\lambda_{min}(H^H H)$ denotes the minimum eigenvalue of the matrix $H^H H$.

23. The method as claimed in claim 14, comprising transmitting the determined rank indicator to the base station.

24. A user equipment for determining a rank indicator, the user equipment comprising two or more receive antennas for supporting a multi-antenna reception mode and for receiving data on a channel used in communication with a base station, the user equipment comprising a processor arranged to:
perform channel measurements for determining a channel matrix H, and
determine the rank indicator based on a channel imbalance factor (CIF), wherein the channel imbalance factor (CIF) quantifies a difference in receive power of the two or more receive antennas.

25. A computer program for a user equipment for determining a rank indicator, the user equipment comprising two or more receive antennas for supporting a multi-antenna reception mode and for receiving data on a channel used for communication with a base station, the computer program comprising computer program code stored on a non-transitory memory, which, when executed by a processor of the user equipment, causes the user equipment to:
perform channel measurements for determining a channel matrix H, and
determine the rank indicator based on a channel imbalance factor (CIF), wherein the channel imbalance factor (CIF) quantifies a difference in receive power of the two or more receive antennas.

* * * * *

UNITED STATES PATENT AND TRADEMARK OFFICE
CERTIFICATE OF CORRECTION

PATENT NO. : 8,654,816 B2  
APPLICATION NO. : 13/375927  
DATED : February 18, 2014  
INVENTOR(S) : Zhang et al.

It is certified that error appears in the above-identified patent and that said Letters Patent is hereby corrected as shown below:

In the Specification

In Column 4, Line 11, delete "$\lambda_{min}$ ($H^HH$)" and insert -- $\lambda_{max}$ ($H^HH$) --, therefor.

Signed and Sealed this  
Eighth Day of July, 2014

Michelle K. Lee  
*Deputy Director of the United States Patent and Trademark Office*